United States Patent [19]

Erlichman

[11] 4,124,858
[45] Nov. 7, 1978

[54] PHOTOGRAPHIC CAMERA HAVING INDEPENDENT VIEWFINDER AND REFLEX FOCUSING SYSTEM

[75] Inventor: Irving Erlichman, Wayland, Mass.

[73] Assignee: Polaroid Corporation, Cambridge, Mass.

[21] Appl. No.: 800,197

[22] Filed: May 25, 1977

[51] Int. Cl.$^2$ ................... G03B 19/12; G03B 13/02; G03B 13/08

[52] U.S. Cl. ................... 354/200; 354/155; 354/224

[58] Field of Search ............... 354/200, 201, 219, 224, 354/225, 162, 166, 168, 150–155, 53, 54

[56] References Cited

U.S. PATENT DOCUMENTS

| | | | |
|---|---|---|---|
| 2,151,124 | 3/1939 | Leitz | 354/166 |
| 2,632,357 | 3/1953 | Mihalyi | 354/166 X |
| 2,909,109 | 10/1959 | Back | 354/155 |
| 2,914,997 | 12/1959 | Grey | 354/155 |
| 2,940,371 | 6/1960 | Thurow | 354/200 X |
| 3,221,627 | 12/1965 | Bing et al. | 354/166 |
| 3,581,644 | 6/1971 | Baker et al. | 354/166 X |

FOREIGN PATENT DOCUMENTS 487,824  11/1952  Canada .................................. 354/224

*Primary Examiner*—Donald Griffin
*Attorney, Agent, or Firm*—Frank J. Caufield

[57] ABSTRACT

A photographic camera apparatus of the type having distinct viewing-focusing and exposure operational modes is provided with a simple, independent, single window optical viewing apparatus suitable for aiming a camera to frame a relatively large format picture area and a through-the-lens reflex focusing apparatus which provides a magnified image, visible in the viewing apparatus, of only part of the camera's field of view so that the focusing apparatus may be comparatively compact and simplified relative to a full field reflex focusing device which would view the entire field of view during focusing. The viewing apparatus also includes a visual indicator for locating the field position within the camera's field of view from which the magnified part image is derived.

18 Claims, 7 Drawing Figures

PHOTOGRAPHIC CAMERA HAVING INDEPENDENT VIEWFINDER AND REFLEX FOCUSING SYSTEM

BACKGROUND OF THE INVENTION

1. Field of the Invention

This invention relates to photographic camera apparatus, and, more particularly, to photographic camera apparatus of the type including an independent eye level viewfinder and a reflex through-the-lens focusing system for providing a magnified image of part of the camera's field of view.

2. Description of the Prior Art

Presently available self-processable type film units, because of their nature, generally have relatively large picture areas with format diagonals exceeding three of more inches. Examples of film units which may have such formats are described in detail in, for instance, U.S. Pat. No. 2,983,606 issued to H. G. Rogers on May 9, 1961 and entitled "Products and Products for Forming Photographic Images in Color" and U.S. Pat. No. 3,415,644 issued to E. H. Land on Dec. 10, 1968 and entitled "Novel Photographic Products and Processes".

Because of these large formats and the need for a resonable field of view, cameras suitable for use with such film units tends to be large in proportion to the film size. Moreover, suitable viewing and ranging apparatus associated with such cameras tend to add to their overall size. However, there are a number of prior art patents which disclose single-lens reflex type cameras that are relatively compact in size in spite of being suitable for use with the larger film format.

One such camera, which folds into a thin compact shape that will fit into a garment pocket, is described in U.S. Pat. No. 3,678,831 issued to James G. Baker on July 25, 1972 and entitled "Compact Folding Reflex Camera". Examples of other folding cameras which employ the camera's objective taking lens as a component of these viewing and focusing arrangements are described in detail in U.S. Pat. No. 3,003,407 issued to D. S. Grey on Oct. 10, 1961 and entitled "Combined Range Finder and View Finder" and U.S. Pat. No. 2,914,997 issued also to D. S. Grey on Dec. 1, 1959 and entitled "Combined Range and View Finder". Examples of non-folding single-lens reflex type cameras are described in, for example, U.S. Pat. No. 3,958,257 issued to Bruce K. Johnson on May 18, 1976 and entitled "Compact Reflex Box Camera", U.S. Pat. No. 3,760,704 issued to James G. Baker on Sept. 25, 1973 and entitled "Reflex Camera and Viewer with Folded Optical Path", U.S. Pat. No. 3,800,309 issued to Edwin H. Land on Mar. 16, 1974 and entitled "Exposure, Viewing and Focusing System", and U.S. Pat. No. 3,672,281 issued to Edwin H. Land on June 27, 1972 and entitled "Reflex Camera".

In each of the foregoing patents, the camera's objective taking lens is employed as part of the viewfinder to provide a "through-the-lens" view of the subject matter which the objective taking lens will image on the film unit. In addition, the camera's taking lens is employed as part of the focusing arrangement such that a camera user may observe an image formed by the objective taking lens to adjust the objective taking lens for sharp focus.

While each of the viewing and focusing arrangements of these disclosures are perfectly satisfactory for the functions they perform, they tend to achieve compactness by using either a relatively large number of optical components or optical components which are relatively complex in nature. Despite these relative complexities, these reflex type cameras have certain viewing and ranging advantages because of the parallax free view they provide of the image formed by the camera's objective taking lens.

In addition to reflex type cameras with through-the-lens viewing and focusing capability, the prior art proposes combined eye level type view and range finders which function independently of the camera's objective taking lens. Examples of this type are described, for example, in U.S. Pat. No. 3,221,627 issued to H. A. Bing et. al. on Dec. 7, 1965 and entitled "Photographic Range and Viewfinder", and U.S. Pat. No. 3,581,644 issued to Philip G. Baker et al. on June 1, 1971 and entitled "Combined Viewfinder-Rangefinder". These disclosures utilize a simple viewing and framing system with a coincidence type ranging device coupled with the focusing movement of the camera's objective taking lens. The viewing system could also be a simple optical device such as a reversed Galilean telescope.

The primary advantage of these systems resides in the simplicity of the viewer. Their primary disadvantage, however, lies in the ranging device which requires maintaining precise manufacturing tolerances for greatest accuracy and the added complication of requiring a linkage which couples the rangefinder to the focusing movement of the camera's objective taking lens. One variation of this type system is disclosed in U.S. Pat. No. 2,632,357 issued to J. Mihalyi on Mar. 24, 1953 and entitled "Combined Range and View Finder". The patentee, in this disclosure, proposes an optical arrangement which provides a magnified part image of the viewing field, independent of the objective taking lens, for purposes of facilitating ranging. This arrangement, however, also has the disadvantages previously referred to in connection with the combined eye level type view and range finder system. Consequently, there is a need in the art for a viewing and ranging system which combines the merits of through-the-lens ranging and the simplicity of viewing independently of a camera's objective taking lens. It is therefore a primary object of the present invention to fulfill this need. Another object of this invention is to provide simplified viewing and focusing apparatus for use with cameras which utilize large format self-processable type film units.

Another object of the present invention is to provide simplified viewing apparatus which functions independently of a camera's objective taking lens in combination with through-the-lens focusing apparatus which uses only part of the image formed by a camera's objective taking lens for purposes of focusing.

Other objects of the invention will in part be obvious and will in part appear hereinafter. The invention accordingly comprises the apparatus possessing the construction, combination of elements and arrangement of parts which are exemplified in the following detailed disclosure.

SUMMARY OF THE INVENTION

This invention relates to a photographic camera, preferably of the type having distinct viewing-focusing and exposure operational modes, which is provided with a simple, independent, single window optical viewfinder suitable for framing relatively large format picture areas having diagonals exceeding three inches or more and a through-the-lens reflex focusing apparatus which provides a magnified image, visible in the viewfinder, of only part of the camera's field of view so that the focusing apparatus may be comparatively compact and simplified relative to a full field reflex focusing device which would view the entire field of view during focusing.

The camera of the invention comprises a housing which includes means for defining an exposure area at a focal plane in which film may be positioned for exposure. A variable focus objective taking lens, having an optical axis, is mounted with the housing in a manner to establish an optical path between the objective taking lens and the focal plane so that a real image of a scene to be photographed may be formed on the focal plane during the camera's exposure operational mode. The objective taking lens and the exposure area at the focal plane cooperate to provide the camera with a field of view of the scene to be photographed.

Means, which preferably take form of reciprocating shutter blades driven by a stepper motor, are provided for effecting the exposure of a film unit positioned in the focal plane during the exposure operational mode.

Viewfinder means, mounted within the housing, are included to facilitate the aiming of the camera to frame the subject matter to be imaged on the focal plane by the objective taking lens during the exposure oeprational mode. The viewfinder means preferably take the form of a reversed Galilean telescope comprising a negative lens and a positive eye lens spaced from the negative lens along an optical axis of the viewfinder means and focused on the virtual image formed by the negative lens. With this preferred arrangement the viewfinder means operates to provide a direct eye level view through a single window, independent of the objective taking lens, of an image of a field of view generally coextensive with the field of view of the camera.

Also included in the camera is a reflex, through-the-lens focusing apparatus which provides an image of part of the camera's field of view to facilitate adjusting the focus of the objective taking lens during the camera's viewing-focusing operational mode. The focusing apparatus comprises a focusing screen having an image-receiving surface of predetermined area, substantially smaller than the exposure area at the focal plane, positioned within the camera housing at a predetermined location with respect to the camera's objective taking lens. Included in the focusing apparatus are first reflecting means for defining a folded optical path between the focusing screen and the objective taking lens. The first reflecting means includes means for intercepting a predetermined bundle of rays emerging from the objective taking lens during the viewing-focusing mode to direct the intercepted rays along the folded optical path and onto the image-receiving surface of the focusing screen. The focusing screen and the first reflecting means are configured and arranged with respect to the objective taking lens to form an image on the focusing screen, of only part of the field of view of the camera.

The intercepting means are movable between a position blocking the optical path of the objective taking lens to prevent scene light emerging from the objective taking lens from reaching the focal plane during the camera's viewing-focusing operational mode and a position unblocking the optical path of the objective taking lens during the camera's exposure operational mode.

Additionally included in the focusing apparatus are means for observing the focusing screen's image-receiving surface, through the viewfinder's eye lens, to magnify the part image of the camera's field of view so that a camera user may observe the magnified part image and adjust the objective taking lens to focus it during the camera's viewing-focusing mode.

In the preferred embodiment of the camera, the optical axis of the viewfinder means is generally parallel with the optical axis of the objective taking lens and the first reflecting means is arranged along a folded optical axis which lies in a plane perpendicular to the optical axis of the objective taking lens. Also in the preferred embodiment, the viewfinder means includes sighting means, visible within its field of view for visually establishing the field position, within the camera's field of view, from which the magnified part image is derived. Additionally, the magnified part image is derived from the center of the camera's field of view and is visible alongside the field of view of the viewfinder means.

The focusing screen of the preferred embodiment comprises a microprism screen.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

DESCRIPTION OF THE PREFERRED EMBODIMENT

Figure 1:
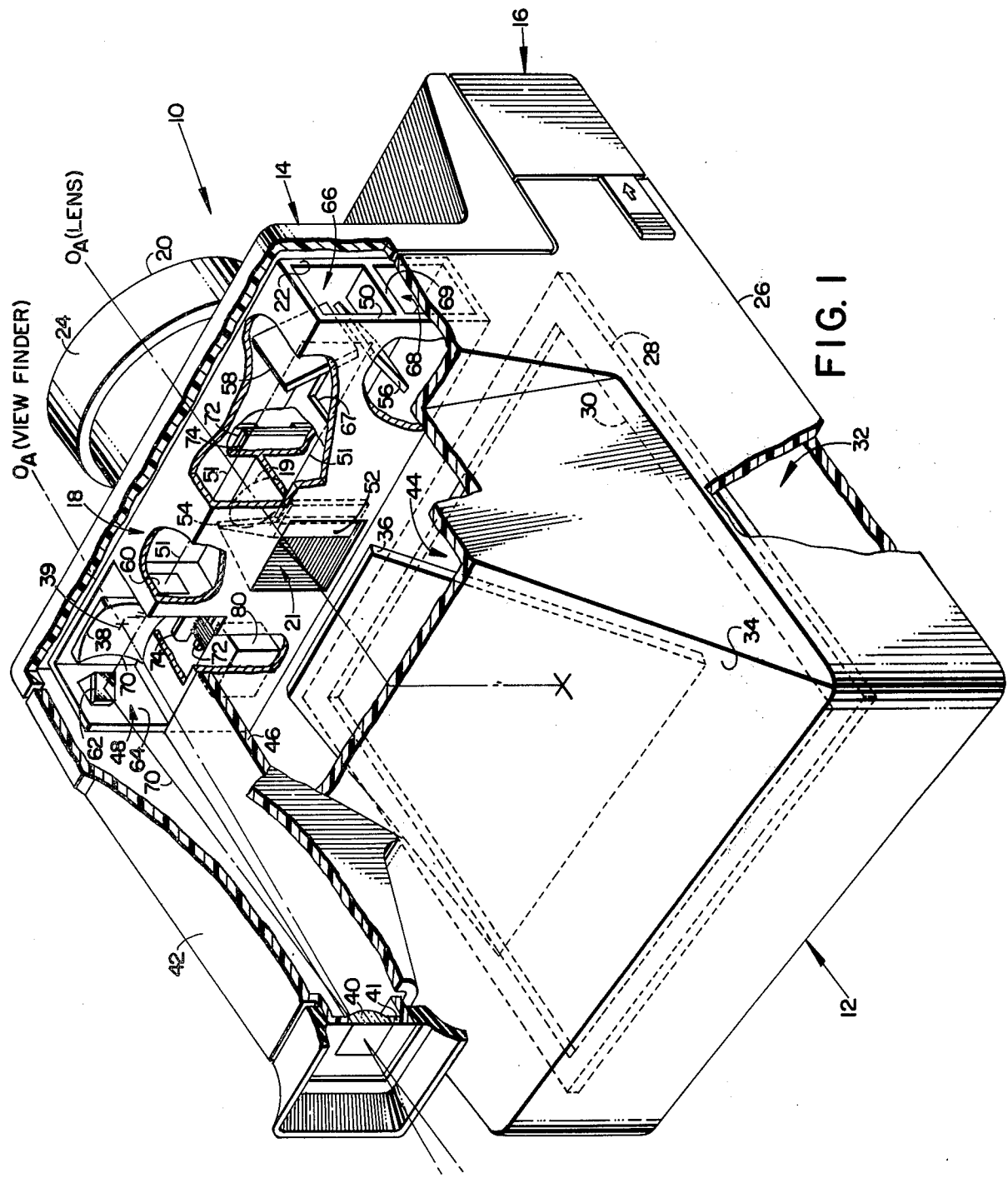
FIG. 1 is a perspective view, with parts broken away, of the camera of the invention shown in its viewing-focusing mode.

Referring now to FIG. 1, there is shown a photographic camera 10 which is the preferred embodiment of the present invention. The camera 10 is preferably of the type which has distinct viewing-focusing and exposure modes of operation and is also particularly suitable for use with film whose picture area may have a format diagonal exceeding 3 inches as, for example, the self-processable types previously referenced.

The camera 10, shown in its viewing-focusing mode in FIG. 1, comprises a body 12, a front cover 14, and a door 16 which interconnect to define its outward appearance and serve as a protective enclosure for housing the camera's interior components.

Within the protective enclosure thus formed is mounted a rectangularly shaped structural member 18 of box-like construction which functions to support, among other components to be subsequently described, a variable focus objective taking lens 20. The objective taking lens 20 is mounted on a forward wall 22 of the structural member 18 and extends through an aperture (not shown) in the front cover 14.

Figure 4:
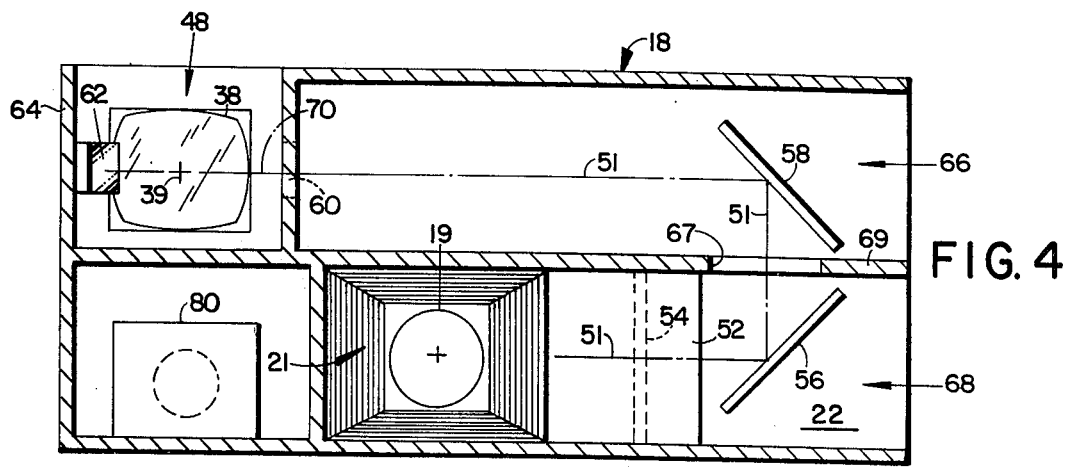
FIG. 4 is a view similar to FIG. 3 illustrating the position of certain parts of the camera of FIG. 1 in its exposure operational mode.

The forward wall 22 has an aperture 19 with which the lens 20 is aligned so as to allow scene light to pass into the interior of the camera 10. Located behind the aperture 19 is a serrated cone-like cavity 21 for reducing stray radiation during the exposure operational mode of the camera 10 as is best illustrated in FIG. 4.

The objective taking lens 20 is preferably a Cooke triplet or similar multi-element type of lens which may have its focal length changed by adjusting the axial air spacing between its optical elements. This may be accomplished in a well-known manner by rotating a bezel, such as that designated at 24, coupled with a screw-threaded lens mount (not shown).

The body 12 includes a bottom wall 26 and an interior wall 28 located in a horizontal plane spaced from the bottom wall 26 and generally parallel to it. Included in the interior wall 28 is an exposure aperture 30 the peripheral edges of which define an exposure area which is preferably dimensioned to be coextensive with the photosensitive area of the film to be used with the camera 10. The bottom wall 26 and the interior wall 28 cooperate to provide a film receiving chamber 32 in which a container of film units (not shown), such as a cassette or the like, may be positioned such that the photosensitive area of the film may be positioned in alignment with the exposure aperture 30 adjacent the bottom side of the interior wall 28. In this manner, the bottom wall 26 and the interior wall 28 provide the housing of the camera 10 with a means for defining an exposure area at a focal plane in which film may be positioned for exposure.

The body 12 also includes a generally planar rear wall 34 slanted at a predetermined angle with respect to the exposure aperture 30 and the optical axis of the objective taking lens 20. Attached to the rear wall 34 is a trapezoidal shaped mirror 36 positioned along the optical axis of the objective taking lens 20, intersecting it at a predetermined angle, to fold the optical axis of the objective taking lens 20 so as to establish a folded optical path between the objective taking lens 20 and the focal plane of the camera 10. With this optical arrangement, rays from a photographic scene which emerge from the objective taking lens 20 during the exposure operational mode are reflected from the mirror 36 onto the focal plane of the camera 10. The exposure aperture 30 and the objective taking lens 20, thus arranged, cooperate to provide the camera 10 with a field of view which defines the area of the photographic scene that will be imaged on the focal plane bounded by the peripheral edges of the exposure aperture 30. It is to be understood that the optical path between the objective taking lens 20 and the exposure aperture 30 need not be folded as described but may be direct. However, the folded optical path allows for a more compact camera and also may be desirable in the case where the film requires an image reversal.

Viewfinder means are provided in the camera 10 for facilitating its aiming to frame the subject matter to be imaged on its focal plane, within the exposure aperture 30, by the objective taking lens 20. The viewfinder means comprise a reversed Galilean telescope including a negative lens 38 mounted in the structural member 18 for forming a virtual image of a scene to be photographed and a positive eye lens 40 mounted in an apertured end wall 41 of an extended tubular section 42 of the body 12 for viewing the virtual image of the negative lens 38. The focal lengths of both the eye lens 40 and the negative lens 38 and the spacing separating them along the optical axis of the viewfinder means are preferably selected so that the eye lens 40 is focused on the plane in which the virtual image of the negative eye lens 38 resides. The eye lens 40 and the negative lens 38, thus arranged, provide an image of a field of view for the viewfinder means, independent of the objective taking lens 20, which field of view is generally coextensive with the field of view of the camera 10. The front cover 14 includes an additional aperture, not shown, but in general registration with the perimeter of the negative lens 38, for purposes of admitting scene light through the negative lens 38 and into the extended tubular section 42. Once scene light is admitted into the tubular section 42, it is precluded from entering an exposure chamber of the camera 10, generally designated at 44, by a bottom wall section 46 and a side wall section (not shown) of the tubular section 42 which contact a rear wall 50 of the structural member 18 along the perimeter of a generally rectangular shaped open compartment 48 located behind the negative lens 38. Additionally, the optical axis of the viewfinder means is preferably generally parallel with the optical axis of the objective taking lens 20 prior to its being folded by the mirror 36.

According to the optical viewfinder arrangement just described, the camera 10 is provided with an eye level viewfinder means which permits a user to directly observe through a single window an image of a field of view that is generally coextensive with the field of view of the camera 10.

A reflex optical focusing arrangement is included in the camera 10 for providing a user with a through-the-lens view, visible within the viewfinder means, of part of the image formed by the objective taking lens 20 so that the user may observe the part image and adjust the focus of the objective taking lens 20 to focus it prior to the exposure operational mode of the camera 10.

Figure 2:
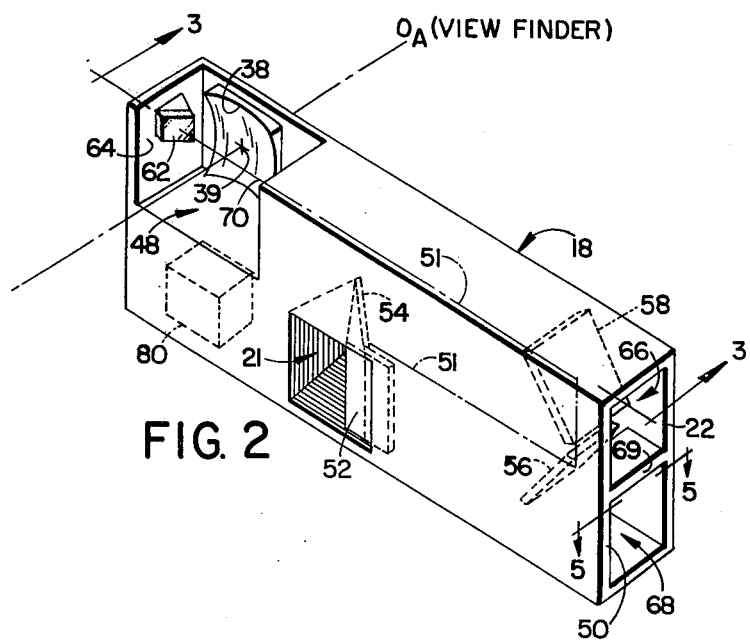
FIG. 2 is a perspective view of a portion of the camera of FIG. 1.

Referring now to FIGS. 1 and 2, there is shown the optical focusing arrangement which includes, mounted in the structural member 18 along a folded optical axis or path 51 perpendicular to the optical axis of the objective taking lens 20, a reflex member 52 having a mirror 54 mounted thereon, a pair of mirrors, 56 and 58, a focusing screen 60 of predetermined dimensions, and a mirror 62 mounted on a side wall 64 of the structural member 18 which, in part, defines the compartment 48 of the structural member 18.

Figure 3:
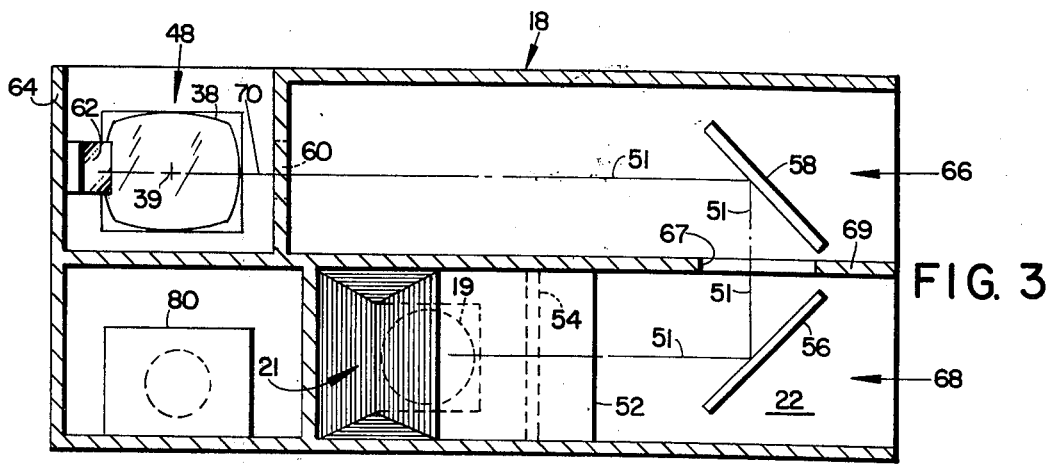
FIG. 3 is a section of the portion of the camera shown in FIG. 2 taken along lines 3—3 of FIG. 2.

The structural member 18, as best seen in FIGS. 3 and 4, is partitioned into an upper compartment 66 and a lower compartment 68 by a middle wall 69 to facilitate the mounting, positioning, and operation of the various components which comprise the focusing arrangement of the camera 10. The structural member 18 is preferably fabricated of a single injection molded plastic piece of unitary construction so that dimensional relationships are established by the molding process so as to minimize tolerance errors. Also an aperture 67 is provided in the middle wall 69 between the compartments 66 and 68 to permit optical communication between the mirrors 56 and 58.

Figure 5:
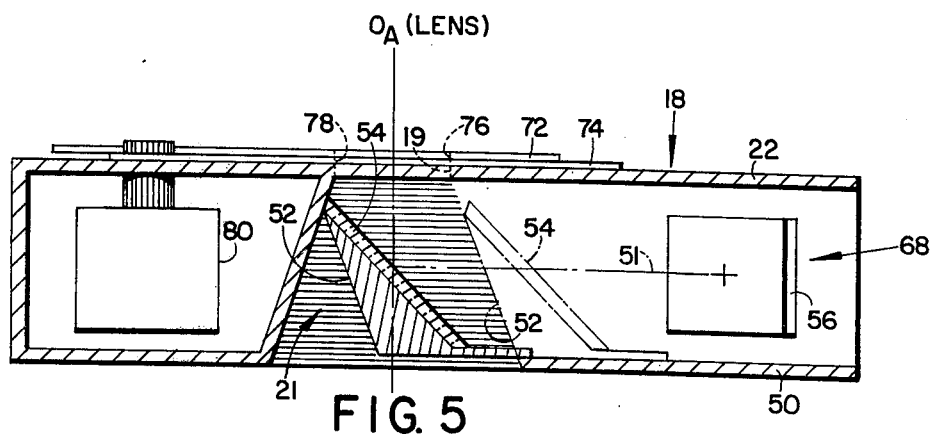
FIG. 5 is a section of the portion of the camera shown in FIG. 2 taken along lines 5—5 of FIG. 2.
Figure 6:
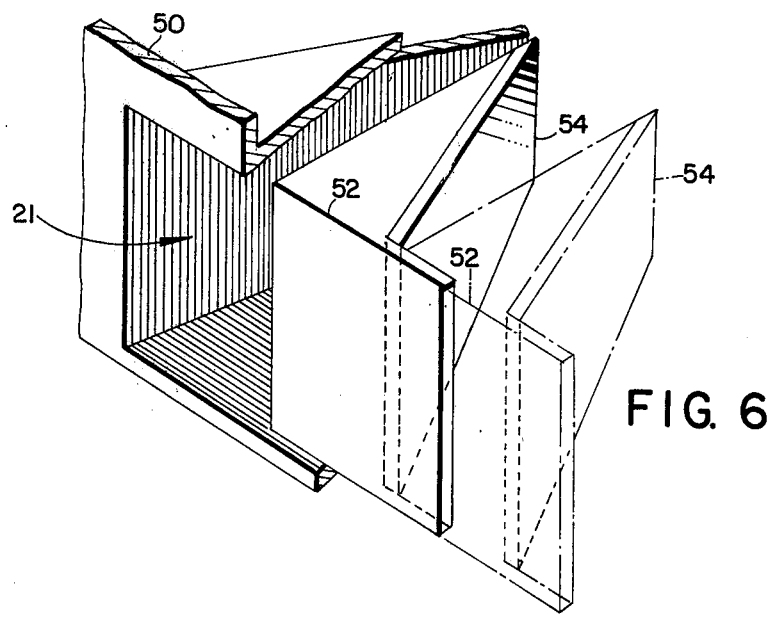
FIG. 6 is an enlarged perspective view of a part of the portion of the camera shown in FIG. 2.

The reflex member 52 is slidably mounted in the lower compartment 68 for movement between a first position as best shown in FIGS. 3, 5 and 6 for blocking the optical path between the objective taking lens 20 and the exposure aperture 30 to prevent scene light emerging from the objective taking lens 20 from reaching the focal plane of the camera 10 during its viewing-focusing operational mode and a second position, as best shown in FIG. 4 and in phantom in FIGS. 5 and 6, for unblocking the optical path of the objective taking lens 20 to permit scene light emerging from the objective taking lens 20 to reach the focal plane of the camera 10 during its exposure operational mode. In this regard, it may be assumed that the aperture 19 may be selectively blocked and unblocked by appropriate exposure means to be subsequently described, to facilitate the viewing-focusing and exposure operational modes of the camera 10.

When the reflex member 52 is in its first blocking position, the mirror 54 is positioned in a 45° plane with respect to the optical axis of the objective taking lens 20 (see FIG. 5) to intercept a predetermined bundle of rays emerging from the objective taking lens 20 to direct the intercepted rays along the folded optical axis 51 toward the mirror 56.

Mirrors 56 and 58 are each arranged in 45° planes with respect to the folded optical axis 51 to define a folded optical path between the mirror 54 and the focusing screen 60 so as to intercept rays reflected from mirror 54 and direct them onto an image-receiving surface of the focusing screen 60. In this manner, a visible image of part of the field of view of the camera 10 is formed on the focusing screen 60. It will be readily apparent to those skilled in the art that the focusing screen 60, the mirrors, 56 and 58, and the mirror 54 may be optically configured and arranged with respect to one another and the objective taking lens 20 in a number of ways to form the part image on the focusing screen 60. However for maximum focusing sensitivity, the mirror 54 should intercept the full bundle of rays emerging from the rear of the objective taking lens 20. Moreover, it is to be understood that the focusing screen 60 is to be located such that the distance through the rays intercepted by the mirror 54 travel from the objective taking lens 20 to the image-receiving surface of the focusing screen 60 during the viewing-focusing operational mode of the camera 10, i.e., the reflex member 60 is in its blocking position, is to be substantially the same as the distance that rays corresponding to the rays intercepted by the mirror 54 travel in reaching the focal plane of the camera 10 during the exposure operational mode of the camera 10. The focusing screen 60 may comprise ground glass but preferably is a microprism screen for facilitating focusing and maximizing image brightness. Also, the area of the focusing screen 60 is preferably substantially smaller than the area of the exposure aperture 30 to facilitate forming the visible part image used in focusing.

Figure 7:
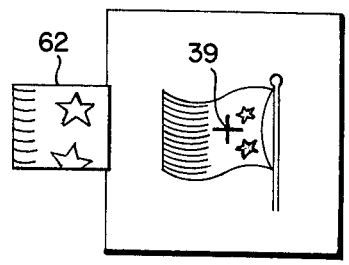
FIG. 7 is a diagrammatic illustration of a photographic scene as seen through the viewfinder of the camera of FIG. 1.

The mirror 62 is mounted on the side wall 64 adjacent the negative lens 38 at a predetermined angle so as to define a folded optical path or axis 70 between the focusing screen 60 and the positive eye lens 40. In this manner, the part image formed on the focusing screen is reflected from the mirror 62 so that it may be observed through the eye lens 40 by a user of the camera 10. Because the part image is viewed through the eye lens 40, it appears magnified to an observer. Moreover, because of the location of the mirror 62, the magnified part image appears aside of the viewfinder field of view as shown in FIG. 7. In this regard, sighting means have been provided in the form of cross hairs 39 centered on the negative lens 38 to visually establish from what part of the camera's field of view the magnified part image is derived. It will be understood that the focusing arrangement may be configured and arranged to derive the magnified part image from various field locations but is preferably arranged to view the center of the field of view of the camera 10 is illustrated.

The distance along the folded optical axis 70 between the eye lens 40 and the focusing screen 60 is preferably substantially equal to the focal length of the eye lens 40.

Means for effecting exposure of a film unit positioned in the focal plane of the camera 10 are provided in the form of a shutter mechanism comprising a pair of shutter blades, 72 and 74, mounted on the structural member 18 behind the objective taking lens 20 (see FIGS. 1 and 5). Each blade, 72 and 74, includes an aperture, 76 and 78, respectively. The shutter blades 72 and 74, are adapted to be driven in reciprocating fashion by a stepper motor 80 under the control of a suitable electronic logic circuit (not shown). The blades, 72 and 74, may be driven in opposite directions to control the relative position of the apertures, 76 and 78, so they may be made to overlap to define an exposure cycle, or, alternatively, the blades, 72 and 74, may be positioned so that no overlap of the apertures 76 and 78 occurs thereby functioning to prevent any scene light emanating from the objective taking lens 20 from passing through the aperture 19. Such a shutter arrangement is well known in the art and is explained in considerable detail in, for example, U.S. Pat. No. 3,882,522 issued to Irving Erlichman on May 6, 1975 entitled "Non-Cocking Springless Shutter Developing Two Parameter Exposure Regulation"; U.S. Pat. No. 3,900,855 issued to John W. Stempeck on Aug. 19, 1975, entitled "Exposure Control System and Method"; U.S. Pat. No. 3,903,528 issued to Richard C. Kee on Sept. 2, 1975, entitled "Exposure Control System for Photographic Apparatus"; and U.S. Pat. No. 3,945,025 issued to John W. Stempeck on Mar. 16, 1976 entitled "Exposure Control System".

The camera 10 operates in the following manner. In the viewing-focusing mode, the shutter blades 72 and 74 are positioned such that the apertures 76 and 78 are fully overlapped to define a maximum opening behind the objective taking lens 20 thereby allowing a clear view through the aperture 19 and the reflex member 52 is located in its blocking position to permit a user to observe the magnified part image visible through the eye lens 40 aside of the field of view of the viewfinder means. The user then surveys the field of view of the viewfinder and selects an object he wishes to focus on. He then aims the camera 10 until the object he selected appears in the cross hairs 39 of the negative lens 38. He then turns his attention to the magnified part image and adjusts the objective taking lens 20 until the magnified part image is sharp. When this is done, the image formed by the objective taking lens 20 on the focal plane of the camera 10 will be equally sharp.

A picture taking cycle is then initiated by depressing a start button (not shown). The shutter blades, 72 and 74, close blocking the optical path of the objective taking lens 20. The reflex member is made to assume its unblocking position by means not shown, after which the shutter blades open and close to define an appropriate exposure cycle after which time they remain closed until the reflex member is made to assume its blocking position again by means not shown. After the reflex member 52 assumes its blocking position, the shutter blades are moved to their full open position so that the camera is again in its viewing-focusing mode.

Certain changes may be made in the above described embodiment without departing from the scope of the invention and those skilled in the art may take such changes according to the teachings of the disclosure. Therefore, it is intended that all matter contained in the above description or shown in the accompanying drawings shall be interpreted as illustrative and not in a limiting sense.

What is claimed is:

1. A photographic camera comprising:
    a housing including means for defining an exposure area at a focal plane in which film may be positioned for exposure;
    a variable focus objective taking lens having an optical axis and mounted within said housing so that a real image of a scene to be photographed may be formed on said focal plane by said objective taking lens, said objective taking lens and said exposure area at said focal plane thus cooperating to provide a field of view for said camera;
    selectively actuable means for admitting scene light from said objective taking lens to said focal plane to define a photographic exposure cycle;
    viewfinder means mounted within said housing for viewing, independently of said objective taking lens, a field of view generally coextensive with said field of view of said camera, said viewfinder means facilitating the aiming of said camera to frame the subject matter to be imaged on said focal plane by said objective taking lens during said photographic exposure cycle; and
    means for providing a view of part of the image formed by said objective taking lens within said viewfinder means so that a camera user may observe said part image and adjust the focus of said objective taking lens to focus said objective taking lens prior to said photographic exposure cycle and while framing the subject matter to be imaged on said focal plane by said objective taking lens.

2. The camera of claim 1 wherein said means for providing a view of part of the image formed by said objective taking lens is configured and arranged so that said part image is visible within said viewfinder means aside of said field of view of said viewfinder means.

3. The camera of claim 1 wherein said means for providing a view of part of the image formed by said objective taking lens includes means for intercepting a predetermined bundle of rays emerging from said objective taking lens to facilitate said view of part of the image formed by said objective taking lens.

4. The camera of claim 3 wherein said intercepting means is configured and arranged to block scene light emerging from said objective taking lens before and after said exposure cycle to prevent such blocked scene light from reaching said focal plane and to unblock scene light emerging from said objective taking lens during said exposure cycle.

5. The camera of claim 4 wherein said means for providing a view of part of the image formed by said objective taking lens further includes:
    a focusing screen having an image-receiving surface positioned in said housing at a predetermined location;
    first reflecting means for defining a folded optical path between said intercepting means and said focusing screen and for receiving scene rays from said intercepting means and directing said received rays onto said image-receiving surface of said focusing screen while scene light emerging from said objective taking lens is blocked; and
    second reflecting means located within said viewfinder means for defining a folded optical path between said focusing screen and an observer's eye so that the image formed on said focusing screen is reflected from said second reflecting means to appear aside of said field of view of said viewfinder means.

6. The camera of claim 5 wherein said viewfinder means is arranged along an optpical axis which is generally parallel to said optical axis of said objective taking lens; and wherein said first reflecting means and said focusing screen are arranged along a folded optical axis which lies in a plane that is perpendicular to said optical axis of said objective taking lens.

7. The camera of claim 5 wherein said predetermined location of said focusing screen is such that the distance through which said intercepted predetermined bundle of rays travel from said objective taking lens to said focusing screen image-receiving surface while scene light emerging from said objective taking lens is blocked is substantially the same as the distance through which rays corresponding to said intercepted predetermined bundle of rays travel in reaching said focal plane during said exposure cycle.

8. The camera of claim 1 wherein said viewfinder means includes means for magnifying said part image so that said part image appears aside of said field of view of said viewfinder means as an enlarged view of part of said field of view of said camera to facilitate focusing of said objective taking lens.

9. The camera of claim 8 wherein said viewfinder means further includes sighting means displayed within its field of view for visually establishing the field position within said camera's field of view from which said magnified part image is derived.

10. The camera of claim 8 wherein said means for providing a view of part of the image formed by said taking lens is configured and arranged with respect to said taking lens so that said magnified part image is derived from the center of said field of view of said camera.

11. The camera of claim 8 wherein said magnifying means of said viewfinder means comprises a positive eye lens.

12. A photographic camera of the type having distinct viewing-focusing and exposure operational modes, said camera comprising:
    a housing including means for defining an exposure area at a focal plane in which film may be positioned for exposure;
    a variable focus objective taking lens having an optical axis and mounted within said housing so that a real image of a scene to be photographed may be formed on said focal plane during said exposure operational mode, said objective taking lens and said exposure area at said focal plane thus cooperating to provide a field of view for said camera;
    means for effecting the exposure of a film unit positioned in said focal plane during said exposure operational mode;
    viewfinder means mounted within said housing for viewing, independently of said objective taking lens, an image of a field of view generally coextensive with said field of view of said camera, said viewfinder means facilitating the aiming of said camera to frame the subject matter to be imaged on said focal plane by said objective taking lens during said exposure operational mode, said viewfinder means comprising a negative lens for forming a virtual image and a positive eye lens spaced from said negative lens along an optical axis of said viewfinder means and focused substantially on said virtual image;

a focusing screen having an image-receiving surface of predetermined dimensions and positioned within said housing at a predetermined location with respect to said objective taking lens;

first reflecting means for defining a folded optical path between said focusing screen and said objective taking lens, said first reflecting means including means for intercepting a predetermined bundle of rays emerging from said objective taking lens during said viewing-focusing operational mode to direct said intercepted rays along said folded optical path and onto said image receiving surface of said focusing screen, said image focusing screen and said first reflecting means being configured and arranged with respect to said objective taking lens to provide an image of a part of the field of view of said camera, said intercepting means being movable between a position blocking scene light emerging from said objective taking lens during said viewing-focusing operational mode and a position unblocking scene light emerging from said objective taking lens during said exposure mode; and means for observing said focusing screen image receiving surface, through said eye lens, to magnify said part image of said field of view of said camera so that a camera user may observe said part image and adjust said objective taking lens to focus said objective taking lens during said viewing-focusing mode.

13. The camera of claim 12 wherein said optical axis of said viewfinder means is generally parallel with said optical axis of said objective taking lens and wherein said first reflecting means are arranged along a folded optical axis which lies in a plane perpendicular to said optical axis of said objective taking lens.

14. The camera of claim 13 wherein said predetermined location of said focusing screen is such that the distance through which said intercepted predetermined bundle of rays travel from said objective taking lens to said image-receiving surface of said focusing screen during said viewing-focusing operational mode is substantially the same as the distance that rays corresponding to said intercepted predetermined bundle of rays travel in reaching said focal plane during said exposure operational mode.

15. The camera of claim 12 wherein said focusing screen observing means comprises second reflecting means positioned in said viewfinder means along a folded optical axis between said eye lens and said negative lens to define a folded optical path between said focusing screen and said eye lens such that said magnified part image of said field of view of said camera is visible alongside said image of said field of view of said viewfinder means.

16. The camera of claim 15 wherein said negative lens of said viewfinder includes sighting means visible within said field of view of said viewfinder means for visually establishing the field position within said camera's field of view from which said magnified part image is derived.

17. The camera of claim 16 wherein said first reflecting means and said focusing screen are configured and arranged with respect to said objective taking lens such that said magnified part image is derived from the center of the field of view of said camera.

18. The camera of claim 15 wherein said focusing screen comprises a microprism screen and wherein the distance along said folded optical axis between said eye lens and said microprism screen is substantially equal to the focal length of said eye lens.

* * * * *